(No Model.)  2 Sheets—Sheet 1.

N. M. GEORGE.
CAR AXLE LUBRICATOR.

No. 322,278. Patented July 14, 1885.

WITNESSES:
Fred. G. Dieterich.

Nathan M. George.
INVENTOR
By Louis Bagger & Co.
ATTORNEYS.

(No Model.) 2 Sheets—Sheet 2.
N. M. GEORGE.
CAR AXLE LUBRICATOR.
No. 322,278. Patented July 14, 1885.
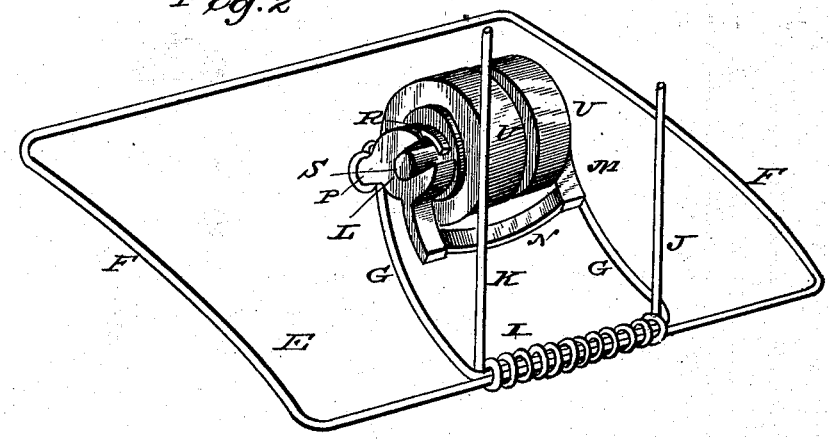
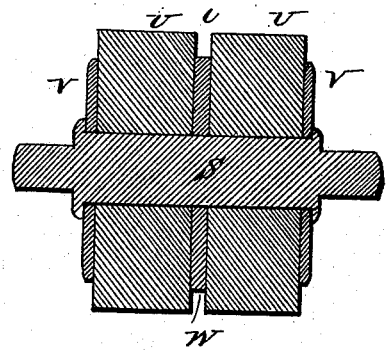
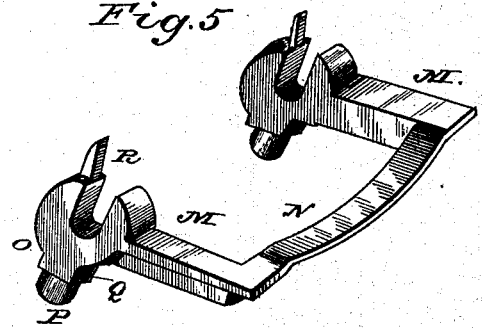
WITNESSES:
Nathan M. George
INVENTOR
By Louis Bagger & Co.
ATTORNEYS

UNITED STATES PATENT OFFICE.

NATHAN M. GEORGE, OF DANBURY, CONNECTICUT.

CAR-AXLE LUBRICATOR.

SPECIFICATION forming part of Letters Patent No. 322,278, dated July 14, 1885.

Application filed November 22, 1884. (No model.)

*To all whom it may concern:*

Be it known that I, NATHAN M. GEORGE, a citizen of the United States, and a resident of Danbury, in the county of Fairfield and State of Connecticut, have invented certain new and useful Improvements in Lubricators; and I do hereby declare that the following is a full, clear, and exact description of the invention, which will enable others skilled in the art to which it appertains to make and use the same, reference being had to the accompanying drawings, which form a part of this specification, and in which—

Figure 1:
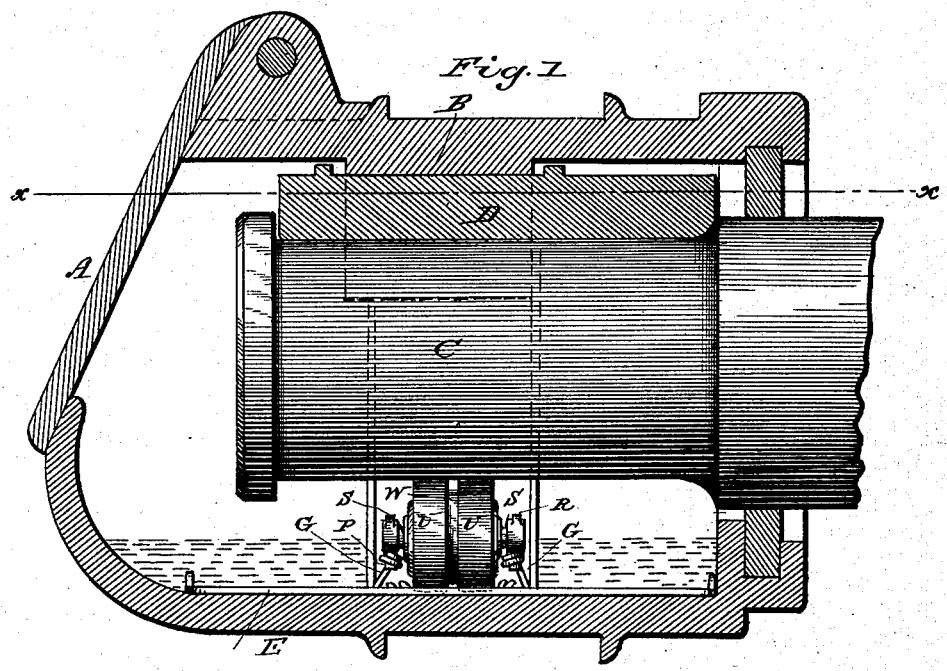
Figure 3:
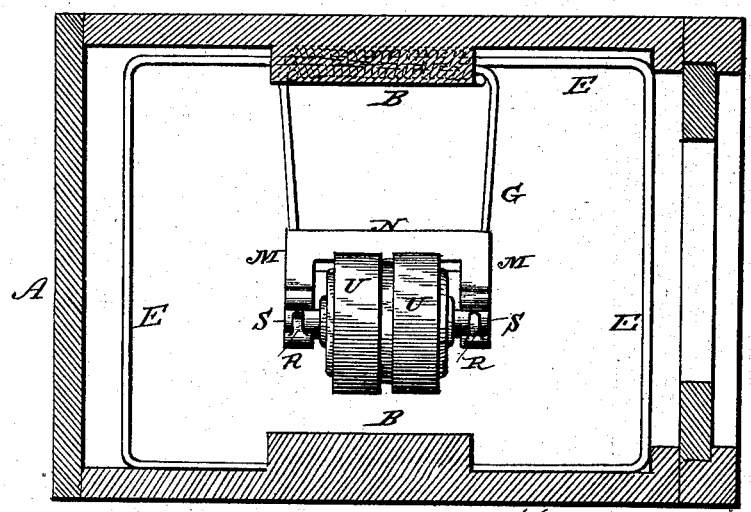

Figure 1 is a longitudinal vertical sectional view of a car-axle box provided with my improved lubricator. Fig. 2 is a perspective view of the lubricator removed from the box. Fig. 3 is a horizontal sectional view of the box with the axle removed, taken on line $x$ $x$, Fig. 1. Fig. 4 is a longitudinal sectional view of the roller, and Fig. 5 is a perspective view of the yoke or bearings for the roller.

Similar letters of reference indicate corresponding parts in all the figures.

My invention has relation to lubricating devices especially adapted for car-axle journals, and more particularly to that class of lubricating devices in which a roller is journaled at the ends of springs, which force the roller against the journal, the said roller serving to draw the lubricant from the bottom of the journal-box and to distribute it upon the journal; and it consists in the improved construction and combination of parts of the same, as hereinafter more fully described and claimed.

Several drawbacks have been experienced in lubricators of this class, among which drawbacks are, that the roller generally has been journaled upon a spindle, turning upon the same, and by the centrifugal force the lubricant upon the said spindle has been driven out to the ends of the perforation of the roller, and thereupon thrown out from the spindle, allowing the roller to run upon the dry spindle, and consequently to wear its perforation as well as the spindle; and to avoid this drawback I secure the roller upon an axle the ends of which turn in open bearings at the ends of the springs which support the roller, and these bearings being open the lubricant dropping from the journal will fall upon the ends of the roller-axle and lubricate the same.

Another drawback has been that the roller has been worn during the time when the lubricator has been used, and while the roller could not be replaced, the roller generally being made of felt, vulcanized fiber, or similar material, and by being worn has been prevented from revolving; and to avoid this I construct my rollers with one or more metallic disks projecting to the periphery of the roller, which disks will not wear as easy as the felt or fiber, and thus by bearing against the journal will continue to keep the roller in revolution carrying the lubricant.

It has likewise been a drawback to these lubricators that the roller has been secured upon the springs in such a manner that it would not tilt with the axle-journal when the axle became tilted in turning curves or by similar causes, and I therefore construct the fastening between the bearings of the roller and the springs in such a manner that the roller may always be parallel with its axle to the axle-journal.

In the accompanying drawings, the letter A indicates the journal-box, which may be of any desired construction, and which has the usual web or rib, B, upon the inner surface of its side.

C indicates the axle-journal, which bears with its upper side against the usual journal-bearing, D.

E is a rectangular frame, of spring-wire, the end pieces, F F, of which are curved slightly upward at their middles, so as to allow the frame to yield laterally, and one side of the frame is formed by the free ends of the wire, which are laid at the sides of each other for a distance at the middle of the side of the frame, whereupon they are bent inward and slightly upward at right angles, forming the roller-supporting springs G.

The parallel portions H H of the spring-wire are held together, and held so as to keep the supporting-springs in their proper position, by means of a wire, I, which is wrapped around the parallel portions, and which has its ends J and K projecting upward, one, J, being shorter than the other and bearing with its end against the lower end of the web B, while the other, K, is longer and bears against the rear edge of the said web, the two ends of the wrapping-wire serving in this manner to prevent the rectangular frame from tilting or shifting in the bottom of the box, while the portion of the wire wrapped around the parallel portions of the frame-wire adds to the spring of the supporting-springs, while it at the same time secures the said portions together.

The bearings L L for the roller-axle are formed in the ends of two parallel arms, M M, connected by a yoke, N, at their lower ends, and the under sides of these arms have flanges O projecting downward from their inner edges, and are provided at their outer ends with downwardly-projecting lugs P, having transverse perforations Q, through which perforations the ends of the supporting-springs G are passed, whereupon the said springs are wrapped around the lugs, the outer portions of the springs, before being inserted through the perforations, passing under the arms M, resting against their under sides and against their flanges O.

The bearings are of malleable metal, open at their upper sides, and one of the lips or sides of each bearing has a lug or lip, R, which may be bent over the open side of the bearing after the axle S of the roller T has been placed with its ends in the bearings, serving to prevent the said ends from slipping out of the bearings during the revolutions of the roller.

The axle S of the roller is enlarged at its middle, the ends being reduced, and the disks U, which may be made of felt, fiber, or any other suitable material, are clamped between washers V V at the ends of the enlarged portion of the axle.

One or more disks, W, of metal, are secured at their central perforations upon the axle between the disks U, one disk being shown in the drawings, and being under ordinary circumstances sufficient, and the said disk or disks are of a slightly smaller diameter than the felt or fiber disks U when the latter are new, and serve to bear against the axle-journal when the felt or fiber disks become worn or otherwise rendered unserviceable, thus causing the roller to continue to draw the lubricant to the axle if the aforesaid felt or fiber disks become useless.

It will be seen that, the bearings for the roller-axle being at the ends of the arms connected by the yoke, the bearings will always retain their relative positions to each other, while by reason of the ends of the supporting-springs being secured only to the downwardly-projecting lugs, the remainder of the springs being free, the ends of the bearing-frame L L M M N may be tilted to conform to any position of the axle-journal, causing the periphery of the roller to bear against the periphery of the journal perfectly parallel to the same, regardless of the position of the journal.

I am aware that lubricating-rollers have been made consisting of a number of disks secured upon a shaft, and I do not claim such construction, broadly; but

I claim—

1. In a car-axle lubricator of the described class, a roller consisting of disks of fibrous material having a disk of metal interposed between them, as and for the purpose shown and set forth.

2. In a car-axle lubricator of the described class, a roller consisting of an axle, disks of fibrous material secured upon the said axle, a disk of metal interposed between the disks of fibrous material, and washers clamping the disks together, as and for the purpose shown and set forth.

3. The combination, with a journal-box having a rib extending downward from the upper edge of one of its sides for a portion of the length of the side, of a rectangular wire frame having portions of the outer ends of the wire placed parallel with each other, and thereupon bent inward and upward at right angles, and a wrapping-wire wrapped around the parallel portions of the frame-wire and bent upward at its ends, forming a longer and a shorter end bearing, respectively, against the rear edge of the rib and against the lower end of the rib, as and for the purpose shown and set forth.

4. The combination, in a journal-lubricator having a lubricant-carrying roller and roller-supporting springs, of a yoke formed by parallel arms having the roller-bearings at their outer ends, and having transversely-perforated lugs at the outer ends of their under sides and downwardly-projecting flanges upon the inner edges of their under sides, and by a cross-piece connecting the inner ends of the arms with the supporting-springs, having their outer ends passed through the perforated lugs and wrapped around the same, and having their outer portions bearing against the flanges of the arms before passing through the perforations in the lugs, as and for the purpose shown and set forth.

5. In a journal-lubricator having a lubricant-carrying roller and roller-supporting springs, the combination, with the roller-axle, of a yoke secured upon the ends of the supporting-springs and formed with bearings upon the upper sides of its ends, the said bearings being open upon their upper sides, and provided at one side of each bearing with a malleable lip adapted to be forced over the open tops of the bearings, as and for the purpose shown and set forth.

In testimony that I claim the foregoing as my own I have hereunto affixed my signature in presence of two witnesses.

NATHAN M. GEORGE.

Witnesses:
WM. SECHER,
KENNETT S. JONES.